United States Patent [19]
Schütz et al.

[11] Patent Number: 6,050,084
[45] Date of Patent: Apr. 18, 2000

[54] SOUND ABSORBING FLUE-GAS DUCT FOR A GAS AND STEAM TURBINE PLANT

[75] Inventors: Herbert Schütz, Uttenreuth; Siegfried Bähr, Eggolsheim; Werner Kraupa, Fürth, all of Germany

[73] Assignee: Siemens Aktiengesellschaft, Munich, Germany

[21] Appl. No.: 08/924,200

[22] Filed: Sep. 5, 1997

[30] Foreign Application Priority Data

Sep. 5, 1996 [DE] Germany .......................... 196 36 107

[51] Int. Cl.[7] ........................................ F02C 7/00
[52] U.S. Cl. ................................. 60/39.5; 181/213
[58] Field of Search ............... 60/39.182, 39.5; 137/872, 875; 181/213, 219, 222

[56] References Cited

U.S. PATENT DOCUMENTS

| 4,131,432 | 12/1978 | Yoshihiro et al. | 60/39.5 |
| 4,821,507 | 4/1989 | Bachmann et al. | 60/39.182 |
| 5,002,121 | 3/1991 | von Erichsen | 137/875 |

FOREIGN PATENT DOCUMENTS 2855219  7/1980  Germany .

*Primary Examiner*—Louis J. Casaregola
*Attorney, Agent, or Firm*—Herbert L. Lerner; Laurence A. Goldberg; Werner H. Stemer

[57] ABSTRACT

A flue-gas duct of a gas and steam-turbine plant is constructed in such a way that reliable sound absorption is ensured with especially simple provisions, even when using internally insulated duct pieces, in particular an internally insulated waste-heat boiler. The flue-gas duct includes a duct piece having a number of sound-absorber gates. At least one sound-absorber gate has a displacement nose disposed upstream thereof on the flue-gas side. A gas-switch module having a displaceable shut-off damper is disposed downstream of the duct piece which is constructed as a sound-absorber module, on the flue-gas side. The shut-off damper includes first and second substantially mutually perpendicularly oriented shut-off plates.

7 Claims, 3 Drawing Sheets

SOUND ABSORBING FLUE-GAS DUCT FOR A GAS AND STEAM TURBINE PLANT

BACKGROUND OF THE INVENTION

Field of the Invention

The invention relates to a duct piece for a flue-gas duct of a gas turbine having a number of sound-absorber panels. The invention also relates to a flue-gas duct and a gas and steam turbine plant.

Gas turbines are used in many sectors for driving generators or machines. The energy content of a fuel is utilized in gas turbines to produce a rotary movement of a turbine shaft. A working medium or hot gas resulting during combustion of the fuel is expanded in the gas turbine for that purpose and is then fed as exhaust gas or flue gas to a flue-gas duct attached to the gas turbine.

In order to increase overall efficiency, a waste-heat steam generator may be disposed downstream of the gas turbine in the flue-gas duct. In the waste-heat steam generator the energy content of the fuel remaining in the flue gas as heat is utilized to evaporate a working medium carried in a water/steam cycle of a steam turbine. Such a combined plant for generating electrical energy is also referred to as a gas and steam-turbine plant (G & S plant).

The flue-gas duct of the gas turbine normally includes a plurality of components or duct pieces connected to one another. Depending on the structure and the location of the gas turbine, a diffuser, an exhaust-gas duct with or without a bypass stack, and further elements, such as, for example, a gas switch and a waste-heat boiler, are provided as components.

During operation of the gas turbine, each component of the flue-gas duct is normally heated by the exhaust gas or flue gas flowing through the components. Heat insulation of the components of the flue-gas duct is therefore normally provided. That may be external insulation, in which the insulating elements are disposed in the external region of the respective component. Alternatively, internal insulation, in which the insulating elements are disposed in the internal region of the respective component, may be provided.

When a gas-turbine plant, in particular a gas and steam-turbine plant, is being constructed, requirements for sound absorption have to be taken into account. For example, an overall sound power level according to ISO 3746 of the entire flue-gas duct of the gas turbine which must not exceed 90 dB(A) may be required. Furthermore, for example, an average sound pressure level which must not exceed 85 dB(A) at a distance of about one meter from components of the flue-gas duct and a sound pressure level which must not exceed 55 dB(A) at a distance of 120 m from the outer limits of the entire plant may be required. In order to fulfill such noise requirements, a number of sound-absorber panels are normally provided in the flue-gas duct of the gas turbine. In a gas and steam-turbine plant having a flue-gas duct which contains a bypass stack, a first set of sound-absorber panels is normally disposed downstream of the waste-heat boiler and a second set of sound-absorber panels is normally disposed in the bypass stack. Such a type of construction is normal, in particular in the case of a vertically disposed, externally insulated waste-heat boiler. German Published, Non-Prosecuted Patent Application 28 55 5219, for example, discloses a gas-turbine waste-heat boiler in which a number of sound absorbers are disposed.

In order to increase the efficiency of a gas and steam-turbine plant, it is possible, for example, to increase the combustion temperature in the gas turbine and thus also the temperature level in the entire flue-gas duct disposed downstream of the gas turbine. However, for technical reasons related to the material, it is necessary in that case to provide mainly internally insulated components for the flue-gas duct, in particular an internally insulated waste-heat boiler and an internally insulated diffuser. However, adequate sound absorption of those internally insulated components, in particular with regard to possible noise requirements, is expensive. To that end, jacketing or encasement of components is normally provided in addition to the sound-absorber panels provided anyway in the bypass stack and downstream of the waste-heat boiler. Such a type of construction and in particular the jacketing of the waste-heat boiler is only possible with high expenditure on material and insulation and is therefore uneconomical.

SUMMARY OF THE INVENTION

It is accordingly an object of the invention to provide a duct piece for a flue-gas duct of a gas turbine, a flue-gas duct and a gas and steam turbine plant, which overcome the hereinafore-mentioned disadvantages of the heretofore-known devices of this general type and which ensure a high degree of sound absorption in a simple and economical manner even when using internally insulated components.

With the foregoing and other objects in view there is provided, in accordance with the invention, a duct piece for a flue-gas duct of a gas turbine, comprising a number of sound-absorber panels having a flue-gas side, and at least one displacement nose disposed upstream of at least one of the sound-absorber panels on the flue-gas side.

The invention starts out from the idea that, in an especially simple and reliable concept for the sound absorption of the flue-gas duct of the gas turbine, jacketing or encasement of components for sound insulation should be dispensed with, even when using internally insulated components. This is possible by providing a number of sound-absorber panels as close as possible to the point of generation of the sound, that is close to the gas turbine. To this end, it is especially suitable for the boiler-inlet duct piece, with its large cross section, to be provided with a number of sound-absorber panels as a "hot sound absorber" close to the outflow region of the gas turbine and upstream of a point at which the flue-gas duct branches into a bypass stack and a waste-heat boiler. However, in such a spatial region, on one hand there is an especially high temperature level of the flue gas. On the other hand, an especially irregular flow profile of the flue gas flowing through the flue-gas duct having especially high local flow velocities occurs in this spatial region. This may result in excessively high mechanical loading of the sound-absorber panels disposed there and thus in damage to the latter. In order to reliably avoid this, the flow profile of the flue gas should be homogenized in a suitable manner and the peak velocities should be reduced. This can be achieved by the displacement noses, which are disposed upstream of the sound-absorber panels and which deflect the flow of the flue gas before it strikes the sound-absorber panels, distribute it in the space and slow it down.

In accordance with another feature of the invention, in order to ensure an especially uniform flow profile of the flue gas in the region of the sound-absorber panels, the displacement nose or each displacement nose has an approximately drop-shaped structure in cross section. In this configuration, the shaping of the displacement noses is directed toward their effect on the flow profile.

In accordance with a further feature of the invention, the duct piece has a plurality of perpendicular sound-absorber panels disposed side by side in the direction of flow of the flue gas, with a displacement nose in each case being disposed upstream of the sound-absorber panels in such a way that the linear extension or size of the displacement noses increases toward the center of the flue-gas duct. Thus increasing spatial filling of the displacement noses toward the center of the flue-gas duct is achieved. This refinement is based on the knowledge that a flow profile of the flue gas normally arises in the flue-gas duct in such a way that the maximum flow velocity occurs in the center region of the flue-gas duct and the minimum flow velocity occurs in the marginal region of the flue-gas duct. A maximum displacement effect in the center region of the flue-gas duct is therefore advantageous in order to even out the flow velocities over approximately the entire cross section of the flue-gas duct.

With the objects of the invention in view, there is also provided a flue-gas duct for a gas turbine, comprising a sound-absorber module duct piece having a number of sound-absorber panels with a flue-gas side, and at least one displacement nose disposed upstream of at least one of the sound-absorber gates on the flue-gas side.

Through the use of such a duct piece, adequate sound absorption is possible even without a configuration of sound-absorber panels in the bypass stack or in the waste-heat boiler.

In accordance with another feature of the invention, the flue-gas duct includes, in addition to the sound-absorber module, a gas-switch module disposed downstream of the sound-absorber module on the flue-gas side having a displaceable shut-off damper with a first shut-off plate and a second shut-off plate oriented essentially perpendicularly thereto. With especially simple provisions, such a gas-switch module permits a reliable changeover between boiler operation in which the flue gas is directed through the waste-heat boiler, and bypass operation in which the flue gas is directed through the bypass stack.

In accordance with a further feature of the invention, the shut-off damper is displaceable through the use of a chain drive in essentially vertical direction. In such a configuration, all points of force application and drive mechanisms provided for driving the shut-off damper can be disposed in the cold region outside the flue-gas duct. The gas-switch module therefore has especially low susceptibility to trouble and a long service life.

In accordance with an added feature of the invention, the first shut-off plate has a number of cooling passages so that the shut-off damper can be cooled.

With the objects of the invention in view, there is additionally provided a gas and steam-turbine plant, comprising a gas turbine having a flue-gas side; and a flue-gas duct downstream of the gas turbine on the flue-gas side, the flue-gas duct including a sound-absorber module duct piece having a number of sound-absorber panels with a flue-gas side, and at least one displacement nose disposed upstream of at least one of the sound-absorber gates on the flue-gas side.

The advantages achieved with the invention are in particular the fact that a uniform incident flow of the hot flue gas to the sound-absorber panels at sufficiently low flow velocity is ensured by the displacement noses disposed upstream of the sound-absorber panels. In addition, a uniform exhaust-gas flow filling the entire cross section of flow of the flue-gas duct is ensured in the flue-gas region behind the displacement noses. Therefore, the mechanical and thermal stress on the sound-absorber panels disposed downstream of the displacement noses is markedly reduced as compared with sound-absorber panels directly exposed to the flue gas. The sound-absorber panels therefore have an especially long service life. The use of a "hot sound absorber" in the flue-gas region close behind the gas turbine or close behind the diffuser is possible precisely because of the service life that is increased in such a way. An expensive noise-protection concept with jacketing of the waste-heat boiler can therefore be dispensed with.

In addition, it has been found that the pressure loss of the flue gas in the flue-gas duct is reduced by the upstream configuration of the displacement noses. In addition to the favorable effects on the service life of the sound-absorber panels, this also results in an increase in the efficiency of such a gas and steam-turbine plant.

In combination with the gas-switch module, which has especially low susceptibility to trouble, such a flue-gas duct and thus also a gas and steam-turbine plant having such a flue-gas duct have especially high reliability and a long service life.

Other features which are considered as characteristic for the invention are set forth in the appended claims.

Although the invention is illustrated and described herein as embodied in a duct piece for a flue-gas duct of a gas turbine, a flue-gas duct and a gas and steam turbine plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
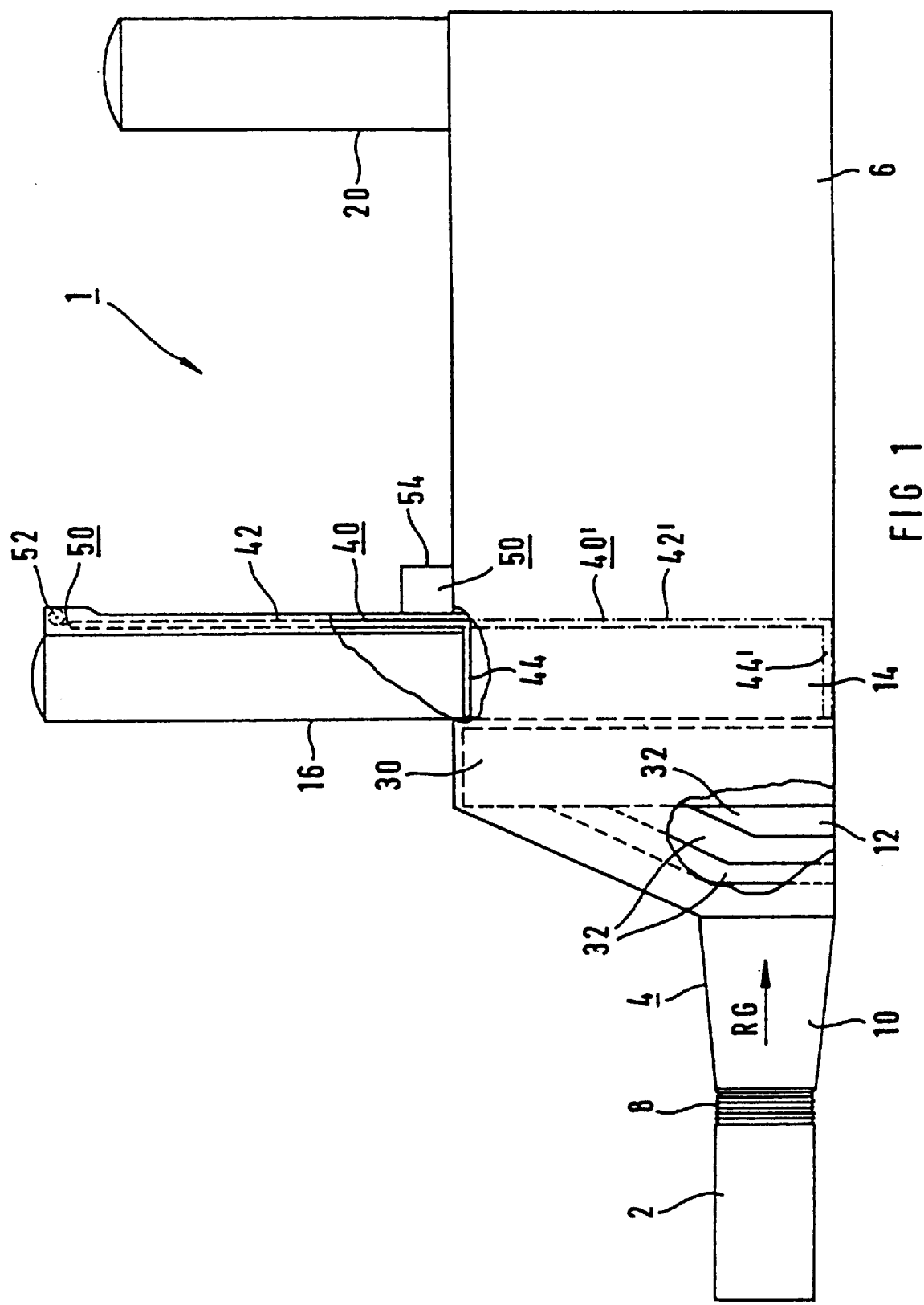
FIG. 1 is a diagrammatic, partly broken-away, side-elevational view of a gas and steam-turbine plant having a flue-gas duct starting from a gas turbine.

Referring now in detail to the figures of the drawings, in which parts corresponding to one another are provided with the same reference numerals, and first, particularly, to FIG. 1 thereof, there is seen a gas and steam-turbine plant 1 which includes a gas turbine 2, a flue-gas duct 4 downstream of the gas turbine 2 and a waste-heat boiler 6 downstream of the flue-gas duct 4 for the generation of steam for a non-illustrated steam turbine. The flue-gas duct 4 contains components or duct pieces, namely a metal compensator 8, a diffuser 10, a duct piece 12, a gas-switch module 14 and a bypass stack 16. A stack 20 is disposed downstream of the horizontally disposed, internally insulated waste-heat boiler 6.

In order to absorb sound during the operation of the gas and steam-turbine plant 1, the duct piece 12 has a number of sound-absorber gates 30, like a sound-absorber module. Each of the sound-absorber panels 30 has a displacement nose 32 disposed upstream thereof. In this case, the sound-absorber panels 30 are disposed side by side in an upright disposition in the direction of flow of flue gas RG. Further sound-absorber panels, for example in the region of the bypass stack 16 or in the region of the waste-heat boiler 6, are not provided in the exemplary embodiment. The sound-absorber panels 30, on one hand, are constructed to be upright like conventional sound-absorber panels, with a fabric material provided for the sound absorption being surrounded by a metallic outer skin provided with holes. The displacement noses 32, on the other hand, are formed of a steel construction in the exemplary embodiment.

The displacement noses 32 are provided for setting a uniform flow profile of the hot flue gas RG flowing through the flue-gas duct 4 of the gas turbine 2, in the region of the sound-absorber panels 30. To this end, each displacement nose 32 is of roughly drop-shaped construction in cross section, as is shown in a plan view in FIG. 2. In addition, a linear extent from displacement nose 32 to displacement nose 32 increases toward the center of the flue-gas duct 4.

Figure 2:
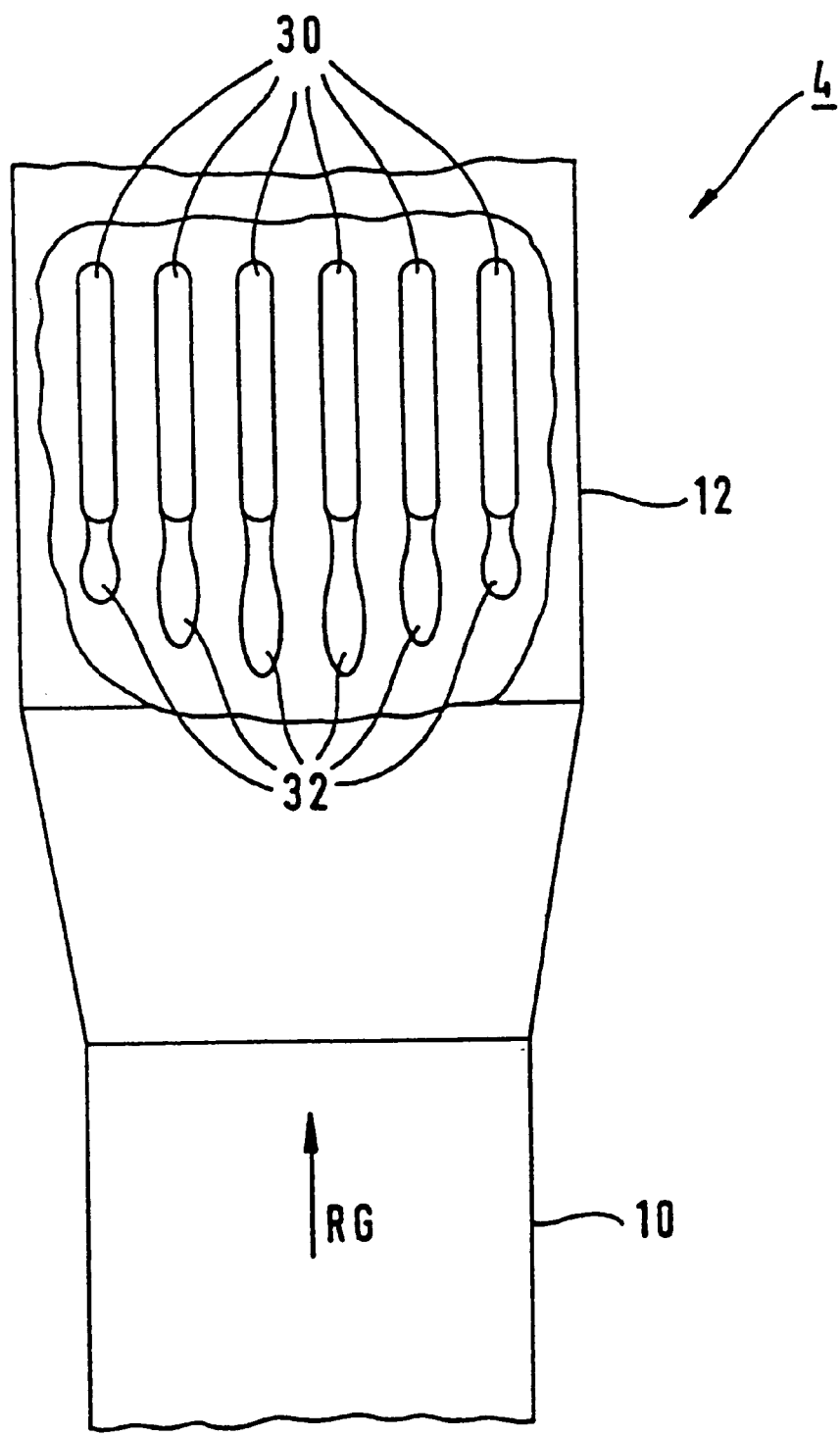
FIG. 2 is a fragmentary, partly broken-away, plan view of the flue-gas duct of the gas and steam-turbine plant according to FIG. 1.

According to FIG. 2, the displacement noses 32 are disposed in a region of widening flow cross section of the flue-gas duct 4, such as, for example, in a boiler inlet duct which is especially suitable for this purpose.

In such a region, the flue gas RG flowing through the flue-gas duct 4 is susceptible to the formation of vortices, which is likewise reduced by the displacement noses 32. Therefore, the pressure loss in the duct piece which is constructed as the sound-absorber module 12 is especially low.

As is also shown in FIG. 1, the duct piece 12 that is provided as a sound-absorber module is disposed upstream of the gas-switch module 14 in the direction of flow of the flue gas RG. The gas-switch module 14, on which the bypass stack 16 is mounted, includes a shut-off damper 40, which is displaceable in vertical or perpendicular direction. The shut-off damper 40 includes a first shut-off plate 42 and a second shut-off plate 44. In this configuration, the second shut-off plate 44, which in each case has an L-shaped cross-sectional profile, is oriented essentially perpendicularly to the first shut-off plate 42.

A changeover between two operating states of the gas and steam-turbine plant 1, namely between the boiler operation and the bypass operation, is possible through a displacement of the shut-off damper 40. On one hand, during boiler operation, in which the flue gas RG of the gas turbine 2 is directed through the waste-heat boiler 6, the shut-off damper 40 is in a raised position. In this case, the second shut-off plate 44 closes the bypass stack 16 on the entry side, whereas the waste-heat boiler 6 is open on the entry side. On the other hand, in bypass operation, the flue gas RG of the gas turbine 2 is drawn off through the bypass stack 16 while avoiding the waste-heat boiler 6. To this end, the shut-off damper is in a lowered position 40' during bypass operation, so that the second shut-off plate rests in a position 44' on the base side and the first shut-off plate is in a position 42' which closes the waste-heat boiler 6 on the entry side. In the process, the second shut-off plate 44 diverts the direction of flow of the flue gas RG toward the bypass stack 16.

In order to provide a changeover between bypass operation and boiler operation (respective open and closed cycles), the shut-off damper 40 is displaceable in vertical direction. In this case, in order to reliably avoid canting of the shut-off damper 40, it has a length/breadth ratio of about 4:1. In order to raise the shut-off damper 40, a chain drive 50 is provided, which contains a non-illustrated drive chain that is fastened to the first shut-off plate 42, is run over a deflection pulley 52 and is connected to a drive unit 54. The force of gravity acting on the shut-off damper 40 is sufficient in order to lower the latter, in which case the chain drive 50 can be used for braking.

The elements and drive units required for changing over the gas-switch module 14 are therefore all disposed in the cold region outside the flue-gas duct 4 and the waste-heat boiler 6. These elements are subjected to markedly lower thermal loading than elements disposed in the hot interior region of the flue-gas duct 4. Therefore, the gas-switch module 14 has an especially long service life.

Figure 3:
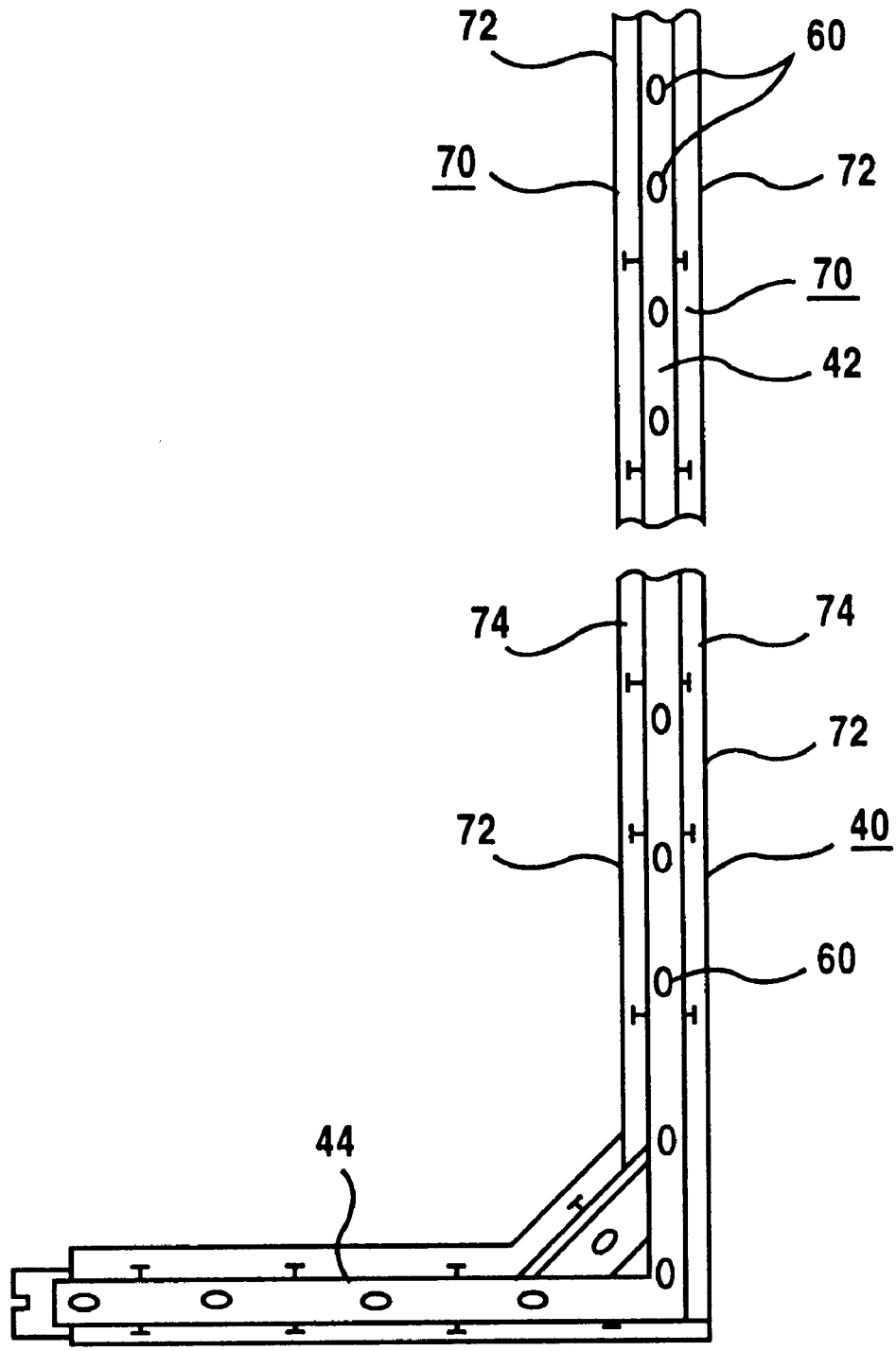
FIG. 3 is a fragmentary, enlarged, side-elevational view of a shut-off damper for a gas-switch module.

As is shown in FIG. 3, the shut-off plates 42 and 44 of the shut-off damper 40 have a number of cooling-air passages which in each case lead into a cooling-air outlet 60. In this case, the dimensioning is such that the load-bearing structure of the shut-off damper 40 has a temperature of at most about 100° C. in every operating state. This ensures that the shutoff damper 40 remains free of distortion in every operating state of the gas and steam-turbine plant 1. In order to also reliably maintain a requisite flow velocity of the cooling air through the shut-off damper 40 in addition to an air quantity sufficient for cooling, the shut-off damper 40 is subdivided in its cross section into flow passages in such a way that the flow passages near the margin are the last through which the cooling air flows before the cooling air is fed through the outlet openings 60 to a closed sealing system.

The shut-off plates 42 and 44 of the shut-off damper 40 are provided on both sides with a heat-insulating covering 70. In this case, the covering 70 includes a number of cover plates 72 of heat-resistant chromium steel, which are interlocked on their long sides with a supporting structure lying underneath, like rolling-shutter elements. In this configuration, joints between each two cover plates 72 are dimensioned in such a way that the cover plates 72 remain level even at a temperature stress of up to about 600° C. An insulating layer 74 of insulating fabric cushions is provided below the cover plates 72. In the exemplary embodiment, insulating fabric cushions of insulating wool, in particular of mineral fiber, are provided, with the insulating wool being sewn into tightly woven, temperature-resistant mats.

In order to provide controllable displaceability, the shut-off damper 40 is guided by guide tubes welded into lateral marginal ducts. Cooling air or sealing air passes through these guide tubes from the respective marginal duct and enters the guide rail. In this case, the guide tubes have ferritic guide blocks. The ferritic guide blocks engage in austenitic guide rails, which are composed of H-shaped sections and are screwed through rubberized-asbestos supports to a supporting frame.

The flue-gas duct 4 having the sound-absorber module 12 and the gas-switch module 14 disposed downstream of the latter is distinguished by an especially long service life of its components. In addition, due to the configuration of the sound-absorber panels 30 like a "hot sound absorber" in the duct piece 12 which is provided as a sound-absorber module, especially effective sound absorption is achieved with simple provisions. Expensive jacketing or encasement of the waste-heat boiler 6 for the purpose of sound absorption can therefore be dispensed with.

In addition, due to the displacement noses 32 disposed upstream of the sound-absorber gates 30, the pressure loss in the duct piece 12 is especially low. The low incident-flow velocity of the flue gas RG in the region of the sound-absorber panels 30 is evened out by the displacement noses 32 and ensures an especially long service life of the sound-absorber panels 30.

Due to the sound absorption in the duct piece 12, the bypass stack 16, just like the stack 20, can be constructed without its own separate sound-absorber panels. This in turn permits the simplified construction of the gas switch as a gas-switch module 14 having the shut-off damper 40. The gas-switch module 14 also has an especially long service life, since all drive units required for changing over the operating state of the flue-gas duct 4 are disposed in the cold outer region of the flue-gas duct 4.

We claim:

1. A duct piece for a flue-gas duct of a gas turbine, comprising:
    a plurality of sound-absorber panels disposed side by side in a flue gas flow direction and having a flue-gas side; and
    a plurality of displacement noses each disposed upstream of a respective one of said plurality of sound-absorber panels on said flue-gas side, said plurality of displacement noses having a linear extension increasing toward a flue-gas duct center and homogenizing a flow profile of a flue gas and reducing peak velocities of the flue gas for reducing mechanical loading of said plurality of sound-absorber panels.

2. The duct piece according to claim 1, wherein at least one displacement nose has a curvilinear structure in cross section.

3. A flue-gas duct for a gas turbine, comprising:
    a sound-absorber module duct piece having a plurality of sound-absorber panels with a flue-gas side;
    at least one displacement nose disposed upstream of at least one of said sound-absorber panels on said flue-gas side; and
    a gas-switch module disposed downstream of said sound-absorber module duct piece in a flue gas flow direction, said gas-switch module having a displaceable shut-off damper with a first shut-off plate and a second shut-off plate oriented substantially mutually perpendicular.

4. The flue-gas duct according to claim 3, including a means for vertically displacing said shut-off damper.

5. The flue-gas duct according to claim 3, including a chain drive for displacing said shut-off damper.

6. The flue-gas duct according to claim 3, wherein said shutoff plates each have a number of cooling passages.

7. A gas and steam-turbine plant, comprising:
    a gas turbine having a flue-gas side; and
    a flue-gas duct downstream of said gas turbine on said flue-gas side, said flue-gas duct including a sound-absorber module duct piece having:
    a plurality of sound-absorber panels disposed side by side in a flue gas flow direction and having a flue-gas side, and
    a plurality of displacement noses each disposed upstream of a respective one of said plurality of sound-absorber panels on said flue-gas side, said plurality of displacement noses having a linear extension increasing toward a flue-gas duct center and homogenizing a flow profile of a flue gas and reducing peak velocities of the flue gas for reducing mechanical loading of said plurality of sound-absorber panels.

* * * * *